(12) United States Patent
Iki

(10) Patent No.: US 8,912,700 B2
(45) Date of Patent: Dec. 16, 2014

(54) ROTOR FOR RELUCTANCE MOTOR

(75) Inventor: Tomotaka Iki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 223 days.

(21) Appl. No.: 13/545,718

(22) Filed: Jul. 10, 2012

(65) Prior Publication Data
US 2013/0015727 A1 Jan. 17, 2013

(30) Foreign Application Priority Data
Jul. 12, 2011 (JP) ................................ 2011-154268

(51) Int. Cl.
H02K 1/27 (2006.01)
H02K 19/06 (2006.01)
H02K 1/24 (2006.01)

(52) U.S. Cl.
CPC ............... *H02K 1/246* (2013.01); *H02K 1/276* (2013.01)
USPC ............. 310/156.53; 310/156.49; 310/156.57

(58) Field of Classification Search
None
See application file for complete search history.

(56) References Cited

U.S. PATENT DOCUMENTS

| | | | |
|---|---|---|---|
| 3,126,493 A | | 3/1964 | Honsinger |
| 3,721,844 A | * | 3/1973 | Fong ............................ 310/166 |
| 4,139,790 A | * | 2/1979 | Steen ....................... 310/156.83 |
| 4,486,678 A | * | 12/1984 | Olson ...................... 310/156.28 |
| 4,658,165 A | * | 4/1987 | Vanderschaeghe ...... 310/156.57 |
| 6,121,706 A | * | 9/2000 | Nashiki et al. ................. 310/168 |
| 7,772,790 B2 | * | 8/2010 | Nashiki ..................... 318/400.02 |
| 7,795,772 B2 | * | 9/2010 | Arimitsu et al. .......... 310/156.57 |
| 2008/0018190 A1 | * | 1/2008 | Takahata et al. .......... 310/156.56 |
| 2009/0230802 A1 | * | 9/2009 | Kamiya et al. ............ 310/156.53 |

FOREIGN PATENT DOCUMENTS

| | | | | | |
|---|---|---|---|---|---|
| JP | 06121504 A | * | 4/1994 | ............. | H02K 21/14 |
| JP | 07039091 A | * | 2/1995 | ............. | H02K 1/27 |
| JP | 11187597 A | * | 7/1999 | ............. | H02K 1/27 |
| JP | 2000209798 A | * | 7/2000 | ............. | H02K 1/27 |
| JP | 2000245087 A | * | 9/2000 | ............. | H02K 1/27 |
| JP | 2001086673 A | * | 3/2001 | ............. | H02K 1/27 |
| JP | 3940207 | | 7/2007 | | |
| JP | 4058576 | | 3/2008 | | |

OTHER PUBLICATIONS

Translated abstract of JP3940207 retrieved from Questel Orbit; accessed on Jun. 27, 2012.
Translated abstract of JP4058576 retrieved from Questel Orbit; accessed on Jun. 27, 2012.

* cited by examiner

*Primary Examiner* — Tran Nguyen
(74) *Attorney, Agent, or Firm* — Andrew Kefalonitis, Jr.

(57) ABSTRACT

A rotor described herein includes a plurality of flux barriers that include at least one magnetic path formed between a plurality of slits. The flux barriers are arranged in a circumferential direction at a predetermined interval. Adjacent flux barriers are concatenated on an inner circumferential side by an annular connector provided on the inner circumferential side, and are separated on an outer circumferential side by openings provided on the outer circumferential side. The rotor also includes a permanent magnet at least partially embedded within the annular connector.

21 Claims, 6 Drawing Sheets

ROTOR FOR RELUCTANCE MOTOR

CROSS-REFERENCE TO RELATED APPLICATION

The present application claims priority under 35 U.S.C. §119 to Japanese Patent Application No. 2011154268, filed Jul. 12, 2011, entitled "Rotor for Reluctance Motor", the contents of which are incorporated herein by reference in their entirety.

BACKGROUND

The embodiments described herein relate generally to reluctance motors, and more specifically, to a reluctance motor configured for use in an electric vehicle. In response to availability issues and costs associated with rare earth metals, electric motors free of rare earth metals are being developed. An example of a type of motor free of rare earth metals that is being developed is a reluctance motor. However, reluctance motors typically develop less torque than surface-mounted permanent magnet (SPM) motors and interior permanent magnet (IPM) motors that include high-performance magnets, for example, neodymium magnets. When included within an electric vehicle, an electric motor that develops higher torque is desired. As referred to herein, an electric vehicle is a vehicle that derives at least a portion of its propulsive force from an electric motor. For example, electric vehicles include vehicles that rely solely on an energy storage device and electric motor for propulsion, hybrid vehicles that rely on an energy storage device and electric motor for propulsion and a fossil fuel based motor to aid propulsion and/or to charge the energy storage device, and/or any other type of vehicle that includes an electric motor.

The magnitude of reluctance torque in a reluctance motor is known to rely on a difference ($|Ld-Lq|$) between a d-axis inductance (Ld) and a q-axis inductance (Lq). The size and number of windings can be increased to raise the reluctance torque, but it is difficult to increase output to the desired level because of the greater d-axis inductance (Ld) and q-axis inductance (Lq). The reluctance torque can be effectively increased by reducing the magnetic resistance of the LqIq magnetic path, increasing the magnetic resistance of the LdId magnetic path, and increasing a saliency ratio (Ld/Lq).

FIG. 6 is a front view of a known reluctance motor 100. Reluctance motor 100 includes a stator core 102 that includes a plurality of teeth 103 and a plurality of slots 104 defined between adjacent teeth. Motor 100 also includes coils 105 wound and fitted into the slots 104 formed between the teeth 103. Motor 100 also includes a rotor core 107 having a plurality of arc-shaped slits 108 and a plurality of arc-shaped magnetic paths 109 formed between each slit 108. The plurality of arc-shaped slits 108 formed in the rotor core 107 function as flux barriers, which increase the magnetic resistance in magnetic path LqIq, reduce the q-axis inductance (Lq), and increase the saliency ratio.

However, when slits 108 are provided within the rotor core 107 to function as flux barriers, q-axis magnetic flux leakage occurs on an outer diameter side of the rotor core 107 which limits the amount the q-axis inductance (Lq) may be reduced. In order to suppress q-axis magnetic flux leakage and further increase the saliency ratio, a known reluctance motor includes a plurality of independent (e.g., segmented) flux barriers having a magnetic path formed between a plurality of slits to reduce the q-axis inductance (Lq).

However, the independently formed and segmented flux barriers may cause issues related to centrifugal force during high-speed rotation of the rotor and to rotor strength with respect to acceleration. The segmented flux barriers also increase manufacturing complexity (i.e., it is difficult to realize a workable structure).

SUMMARY

In one aspect, a rotor for a reluctance motor is provided. The rotor includes a plurality of flux barriers that includes at least one magnetic path formed between a plurality of slits. The flux barriers are arranged in a circumferential direction at a predetermined interval, wherein adjacent flux barriers are concatenated on an inner circumferential side by an annular connector provided on the inner circumferential side. Adjacent flux barriers are separated on an outer circumferential side by openings provided on the outer circumferential side. The rotor also includes a permanent magnet at least partially embedded within the annular connector.

In another aspect, a reluctance motor is provided. The reluctance motor includes a stator that includes a stator core having a plurality of stator teeth. The reluctance motor also includes a rotor configured to rotate with respect to the stator about a central axis that extends through a center of the rotor from a first end of the rotor to a second end of the rotor. The rotor includes a rotor core that includes an inner surface and an outer surface coaxially arranged about the central axis. The rotor also includes a plurality of flux barriers defined within the rotor core, the flux barriers extending axially through the rotor core from the first end to the second end. The rotor also includes an annular connector included within the rotor core, wherein adjacent flux barriers are concatenated on an inner circumferential side by the annular connector. The rotor also includes a plurality of openings defined within the rotor core along the outer surface of the rotor core, wherein adjacent flux barriers are separated by an opening of the plurality of openings.

In yet another aspect, a rotor core having an inner circumferential side and an outer circumferential side is provided. The rotor core includes a plurality of flux barriers arranged in a circumferential direction around the rotor core at a predetermined interval. The flux barriers that are adjacent to each other in the circumferential direction are concatenated on the inner circumferential side by an annular connector. Adjacent flux barriers are separated by openings in the rotor core that extend to the outer circumferential side.

BRIEF DESCRIPTION OF THE DRAWINGS

FIG. 5 is used to explain a flow of magnetic flux in the rotor of a comparative example, in which FIG. 5A shows the flow of magnetic flux on the d-axis, and FIG. 5B shows the flow of magnetic flux on the q-axis.

DETAILED DESCRIPTION

Figure 1:
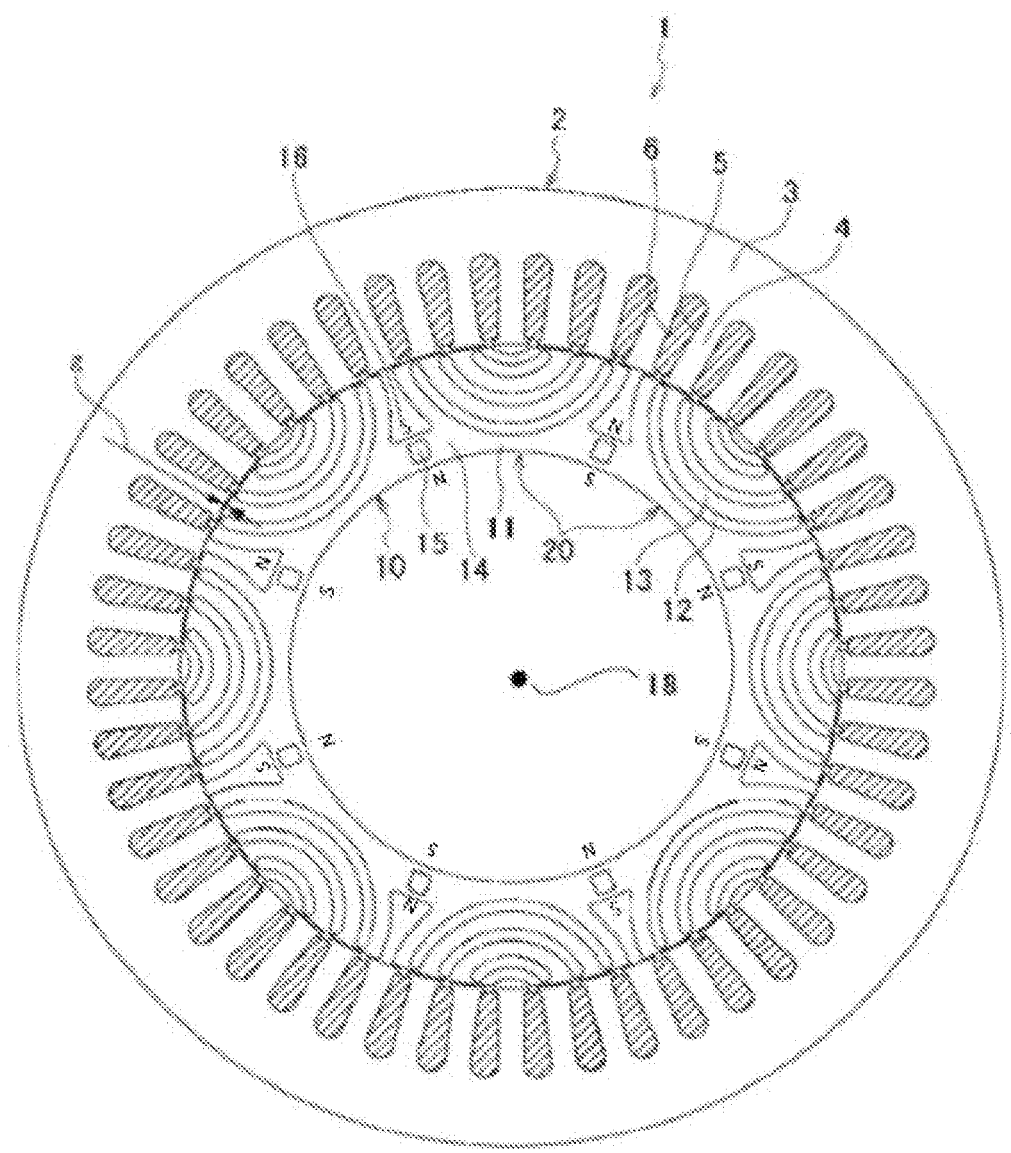
FIG. 1 is a front view of an exemplary reluctance motor.

The embodiments described herein relate generally to electric motors, and more specifically, to reluctance motors. More specifically, a rotor described herein facilitates improving torque characteristics of a reluctance motor while maintaining rotor strength and manufacturing ease.

For example, in the exemplary embodiment, the rotor includes a plurality of flux barriers (for example, flux barrier 20 in the embodiment described below) with a magnetic path (for example, magnetic path 13 in the embodiment described below) formed between a plurality of slits (for example, slit 12 in the embodiment described below) arranged in the circumferential direction at a predetermined interval. In this rotor, adjacent flux barriers are concatenated on the inner circumferential side by an annular connector (for example, annular connector 14 in the embodiment described below) provided on the inner circumferential side and separated on the outer circumferential side by openings (for example, opening 16 in the embodiment described below) provided on the outer circumferential side, and permanent magnets (for example, permanent magnet 15 in the embodiment described below) are embedded in the annular connector. In at least some embodiments, the permanent magnets are magnetized in the radial direction of the rotor.

Adjacent flux barriers are concatenated by an annular connector that includes a permanent magnet. The permanent magnet causes magnetic saturation of the annular connector, which increases the magnetic resistance, and reduces the q-axis inductance (Lq). Reducing the q-axis inductance (Lq) while maintaining a d-axis inductance (Ld) increases reluctance torque and, thus, improves torque properties. Because this can increase the magnetic resistance of the annular connector, a configuration can be realized having a greater saliency difference. Because the permanent magnets only have enough magnetic force to magnetically saturate the annular connector, they do not experience the demagnetizing field effect that commonly occurs in permanent magnets. Also, in order to use them in a high permeance environment, a high retention force material is not required. Thus, dysprosium (Dy)-free magnets and inexpensive ferrite magnets can be used. Because the flux barriers are integrally concatenated by an annular connector, a conventional structural design can be used for the rotor, the mechanical strength of the rotor is greater, and the rotor is highly reliable in operating environments requiring high-speed rotation and both rapid acceleration and deceleration.

Because the permanent magnets in the second aspect of the present invention are magnetized in the radial direction of the rotor and embedded in the annular connector, the magnetic force of the permanent magnets does not affect the stator. As a result, drag loss does not occur, and measures such as field weakening are not required even at high rotational speeds.

Figure 2:
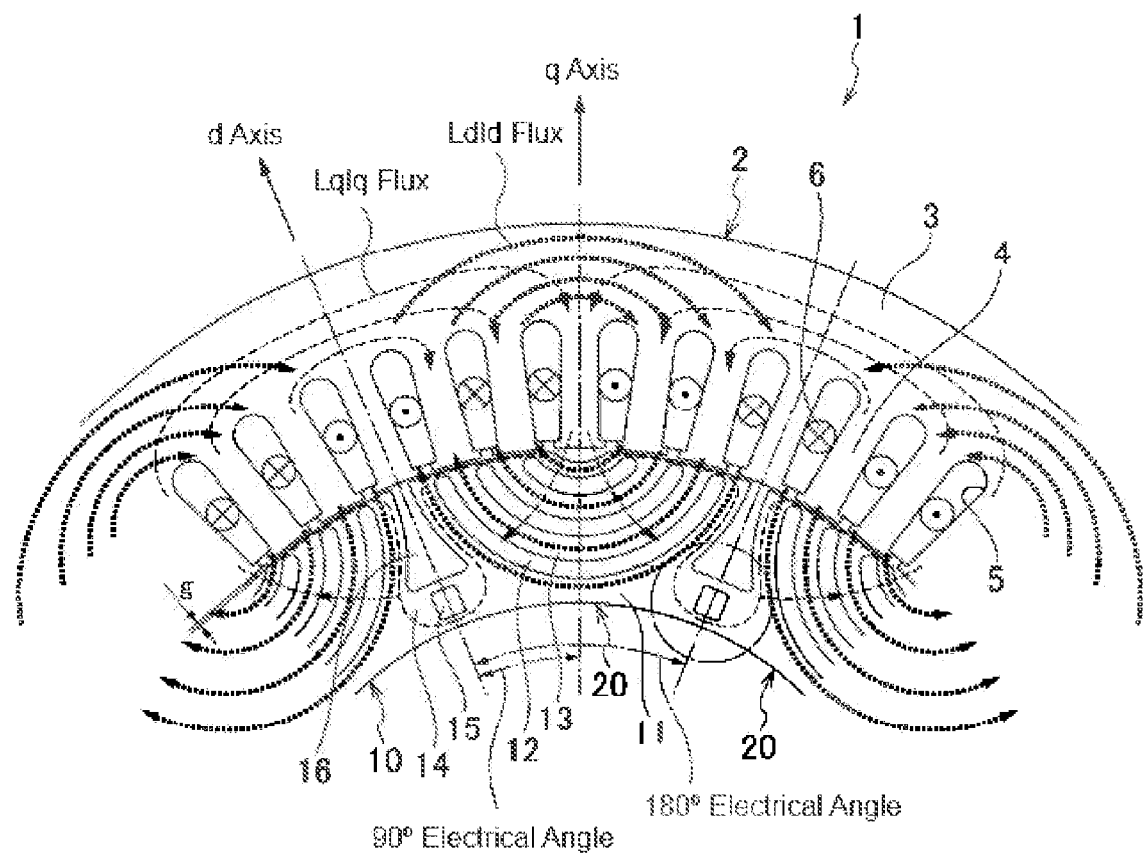
FIG. 2 is an explanatory diagram showing the flow of magnetic flux in the reluctance motor shown in FIG. 1.
Figure 3:
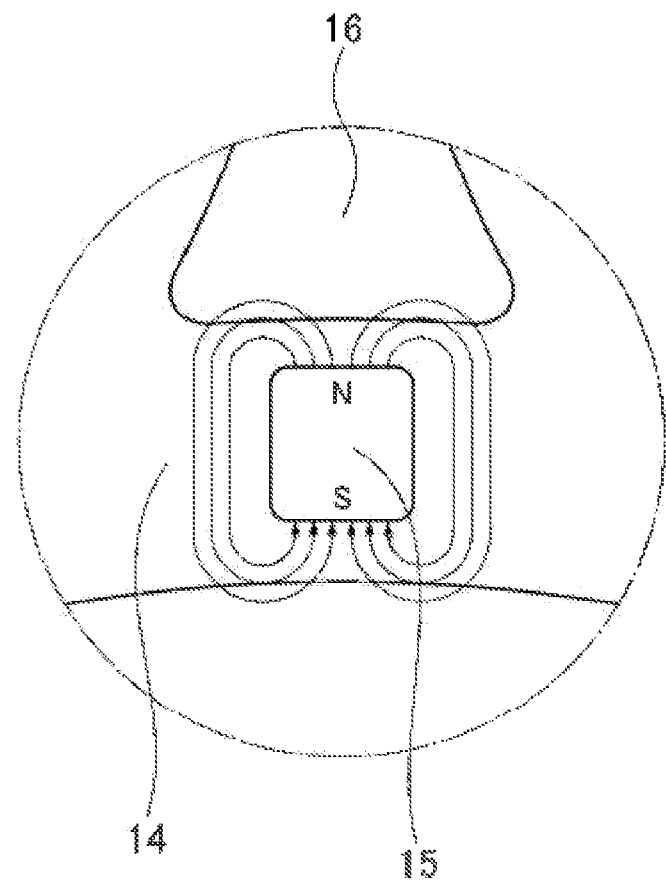
FIG. 3 is an enlarged view showing the magnetization direction of an exemplary permanent magnet included within the reluctance motor shown in FIG. 1.

Referring now to the figures, FIG. 1 is a front view of an exemplary reluctance motor 1, FIG. 2 is an explanatory diagram showing the flow of magnetic flux within the reluctance motor 1, and FIG. 3 is an enlarged view showing a magnetization direction of an exemplary permanent magnet included within reluctance motor 1. As shown in FIG. 1 and FIG. 2, the reluctance motor 1 includes a stator 2, and a rotor 10 opposing an inner circumferential portion of the stator 2 via an air gap (g). Stator 2 includes a stator core 3. An outer circumferential portion of the stator core 3 is fixed to a frame or the like (not shown in the drawings). Rotor 10 includes a rotor core 11. Rotor 10 is supported rotatably by a shaft (not shown in the drawings) positioned along a central axis 18 of the rotor core 11.

In the exemplary embodiment, the stator core 3 and the rotor core 11 are formed by punching magnetic steel sheets into a predefined shape and stacking a plurality of these sheets in an axial direction to form a laminated stator core 3 and/or rotor core 11. Alternatively, stator core 3 and/or rotor core 11 may be solid rather than laminated, for example, but not limited to, composed of a soft magnetic material using a sintering process.

In the exemplary embodiment, stator core 3 includes a plurality of teeth 4 and a corresponding plurality of slots 5 defined between adjacent teeth 4. Teeth 4 extend from an inner circumferential portion of the stator core 3. Stator 2 also includes a plurality of coils 6 that are wound around teeth 4 and disposed within slots 5. Although illustrated as including forty-eight teeth 4 and forty-eight slots 5, stator 2 may include any suitable number of teeth and/or slots that allow reluctance motor 1 to function as described herein.

In the exemplary embodiment, rotor core 11 includes a plurality of flux barriers 20 arranged in a circumferential direction around rotor core 11 at a predetermined interval. For example, rotor core 11 may include eight flux barriers 20 spaced evenly around a circumference of rotor core 11. In the exemplary embodiment, each flux barrier 20 includes a plurality of arc-shaped slits 12 defined within rotor core 11. For example, in the illustrated embodiment, each flux barrier 20 includes three arc-shaped slits 12 defined within rotor core 11. Although described herein as arc-shaped, slits 12 may alternatively be formed in a substantially v-shape and/or any other suitable shape that allows reluctance motor 1 to function as described herein. A protruding side of each slit 12 faces the axial center 18 of rotor core 11, and the slits 12 are spaced in a radial direction from the axial center 18 of rotor core 11. Each slit 12 constitutes a barrier to magnetic flux. In the exemplary embodiment, rotor core 11 also includes a plurality of arc-shaped magnetic paths 13 defined between the slits 12.

An outer circumferential surface of the rotor core 11 beyond the slits 12 positioned on an outermost circumferential side of rotor core 11 in the radial direction is formed so as to decline towards the axial center 18 of rotor core 11, and magnetic paths 13 are formed beyond the slits 12 positioned on the outermost circumferential side in the radial direction. In other words, a plurality of indentations are defined within an outer surface of rotor core 11. The indentations extend axially along the outer surface of rotor core 11 and are centered at a center of the slits 12 (i.e., are aligned with a centerline of flux barriers 20 (see FIG. 2)). Therefore, in the exemplary embodiment, a radial distance from the axial center 18 to the outer surface of the rotor core at a center of the slits 12 is less than a maximum radial distance from the axial center 18 to the outer surface of the rotor core 11.

In the exemplary embodiment, rotor core 11 includes an annular connector 14 provided on an inner circumferential side of the rotor core 11. Adjacent flux barriers 20 are concatenated on the inner circumferential side by annular connector 14. Rotor core 11 also includes a plurality of openings 16 defined therein. More specifically, openings 16 open into the outer circumference of the rotor core 11 between adjacent flux barriers 20 and extend in a radial direction from the outer circumference of rotor core 11 toward the annular connector 14. Each of openings 16 constitutes a barrier to magnetic flux. In other words, flux barriers 20 adjacent to each other in the circumferential direction are separated on the outer circumferential side of rotor core 11 by openings 16.

As shown in FIG. 3, rotor 10 also includes a plurality of permanent magnets 15 at least partially embedded within rotor core 11. For example, rotor 10 includes permanent magnets 15 embedded within a plurality of magnet openings defined within rotor core 11, and more specifically, within a plurality of magnet openings defined within the annular connector 14 portion of rotor core 11. Permanent magnets 15 may include ferrite magnets and/or any other suitable type of magnet that allows reluctance motor 1 to function as described herein. In the exemplary embodiment, magnets 15 are magnetized in the radial direction of the rotor 10 and are embedded within annular connectors 14. The permanent magnet 15 in FIG. 3 is arranged so that a north (N) pole is positioned on the outside in the radial direction and a south (S) pole is positioned inward in the radial direction. Alternatively, the S pole may be positioned on the outside in the radial direction and the N pole positioned inward in the radial direction. Also, the orientation of the magnetic poles of all of the permanent magnets 15 (e.g., eight in the illustrated embodiment) may be aligned, or the orientation of the magnetic poles of the permanent magnets 15 may alternate.

In the exemplary embodiment, flux barriers 20 are configured such that magnetic flux flows between adjacent flux barriers 20 with ease in a first direction (d-axis direction) and flows between adjacent flux barriers 20 with difficulty in a second direction (q-axis direction). In other words, the magnetic flux readily flows in the d-axis direction because arc-shaped magnetic paths 13 are formed between slits 12, and passage of the magnetic flux is difficult in the q-axis direction because slits 12 functioning as flux barriers intervene at nearly a right angle to the magnet flux. Because the magnetic poles of a typical motor point in the d-axis direction, a centerline between adjacent flux barriers 20 is on a d-axis centerline of the magnetic poles (position of N and S), and the centerline of the flux barriers 20 is on the q-axis centerline between magnetic poles.

Also, the reluctance torque (Tq) of reluctance motor 1 is known to be represented by Equation 1. Therefore, to effectively generate greater reluctance torque (Tq), the d-axis inductance (Ld) can be increased or the q-axis inductance (Lq) decreased.

$$Tq \propto |Ld-Lq| \times Id \cdot Iq \quad \text{(Equation 1)}$$

Tq is the reluctance torque, Ld is the d-axis inductance, Lq is the q-axis inductance, Id is the d-axis current, and Iq is the q-axis current.

Figure 5:
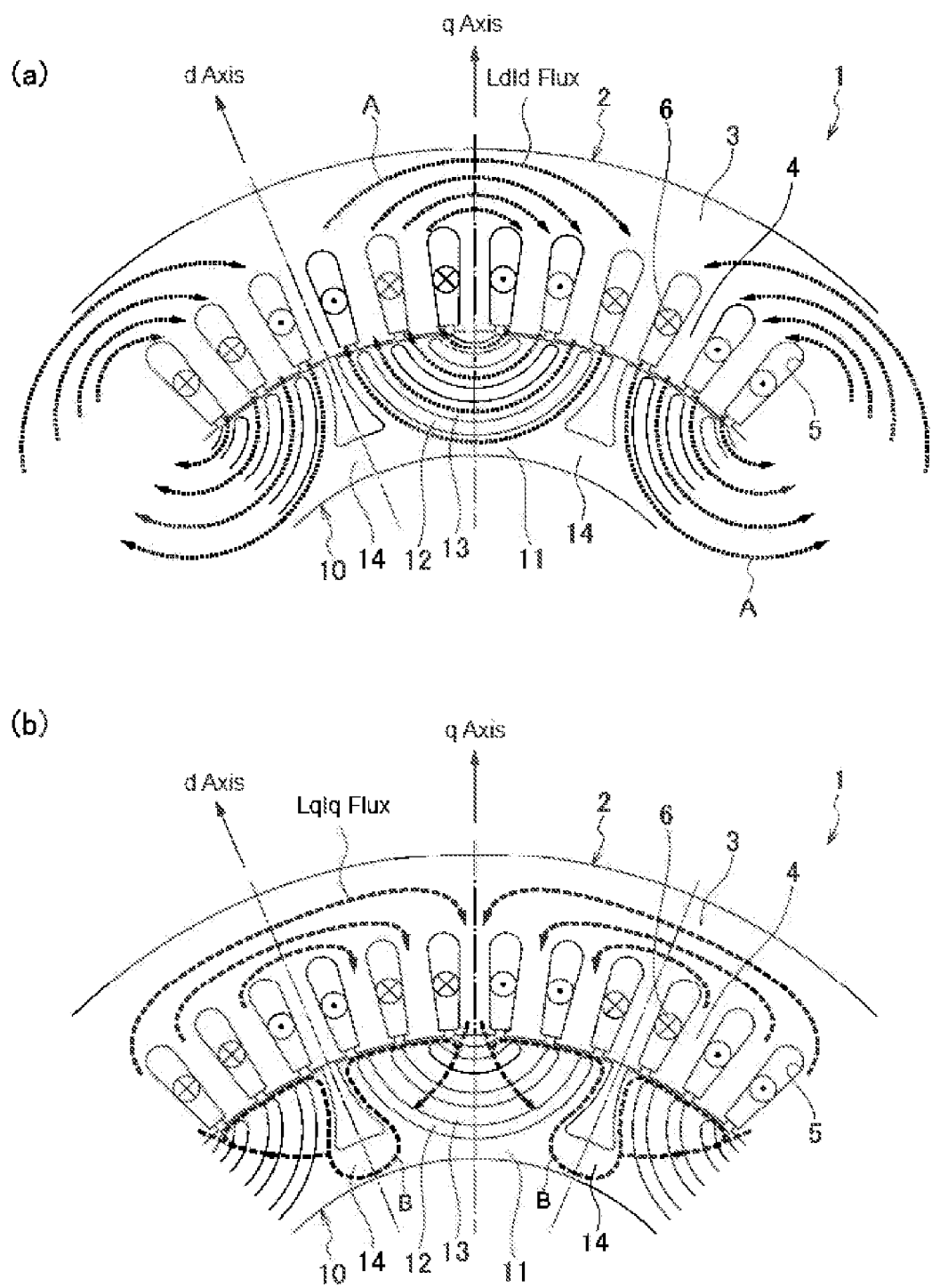

FIG. 5A and FIG. 5B are diagrams showing the flow of d-axis and q-axis magnetic flux in a rotor in which the annular connector 14 is not provided with permanent magnets 15 (shown in FIG. 3). As shown in FIG. 5A, magnetic paths 13 made of a magnetic steel plate are provided between slits 12 in the magnetic passages on the d-axis. As a result, magnetic resistance is reduced, and the magnetic flux of the coil 6 easily passes along the magnetic paths 13 in the direction of arrow A.

Meanwhile, as shown in FIG. 5B, the plurality of arc-shaped slits 12 functioning as flux barriers intervene with the magnetic passages on the q-axis so as to be perpendicular to the magnetic passages. As a result, the magnetic resistance increases, and the magnetic flux of the coils 6 has difficulty passing through. This creates a difference between the d-axis inductance (Ld) and the q-axis inductance (Lq), and generates reluctance torque Tq. However, some of the magnetic flux of the coil 6 flows through a portion of the rotor core having a low magnetic resistance, that is, through an outer circumferential portion of the rotor 10 and the annular connector 14 (in the direction of arrow B). This sufficiently reduces the q-axis inductance (Lq), and impedes the generation of large reluctance torque (Tq).

In contrast, the rotor 10 of the exemplary embodiment, as shown in FIG. 2 and FIG. 3, includes permanent magnets 15 embedded within the annular connector 14 to magnetically saturate the annular connector 14. The magnetic saturation increases the magnetic resistance of the magnetic paths on the q-axis, reduces the q-axis inductance (Lq), and increases inductance torque (Tq).

Figure 4:
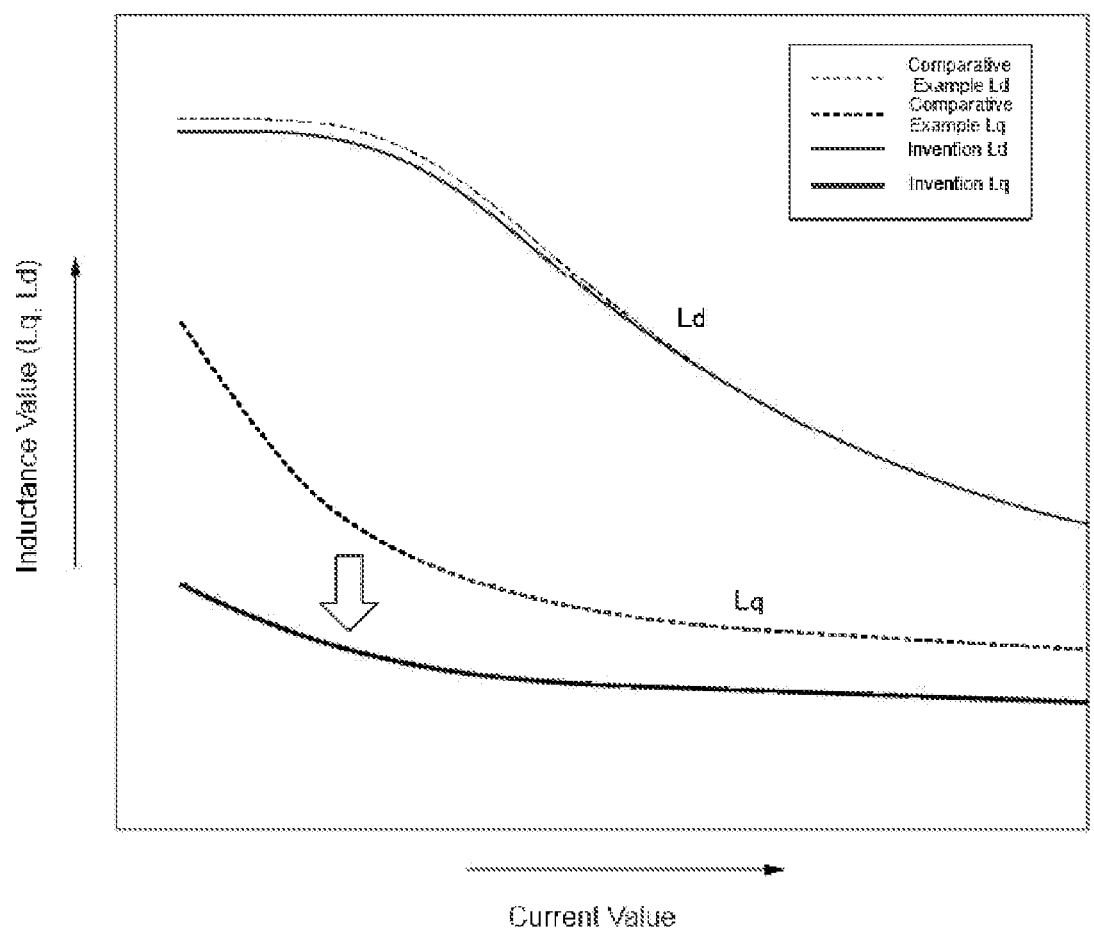
FIG. 4 is a graph showing a relationship between inductance values (Lq, Ld) associated with the reluctance motor shown in FIG. 6 and inductance values associated with the reluctance motor shown in FIG. 1.
Figure 6:
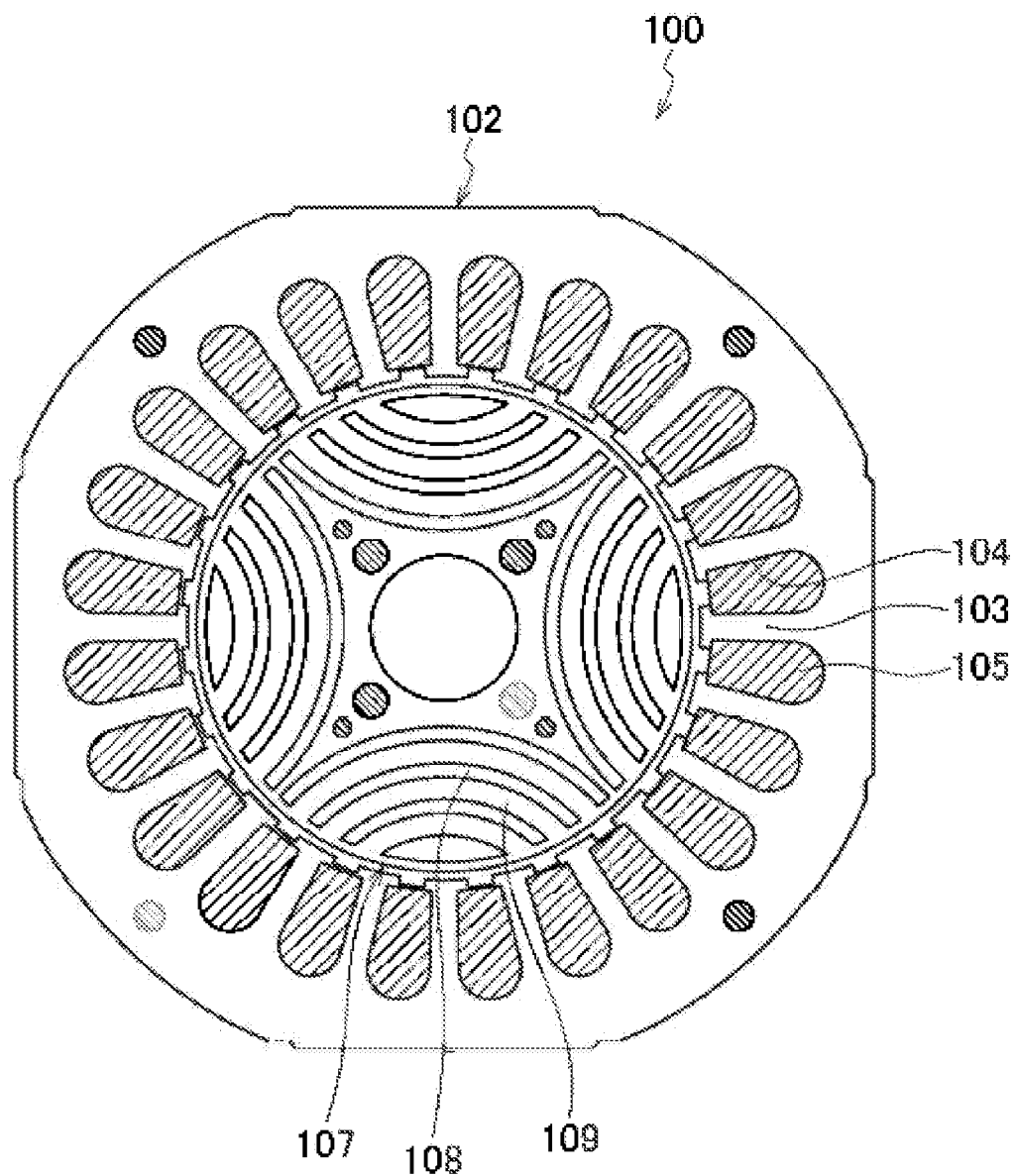
FIG. 6 is a front view of a known reluctance motor.

FIG. 4 is a graph showing a relationship between inductance values (Lq, Ld) associated with the reluctance motor shown in FIG. 6 and inductance values associated with the reluctance motor shown in FIG. 1. The inductance values of the rotor shown in FIG. 6 (i.e., the comparative example in which permanent magnets 15 are not embedded in the annular connector 14) are indicated by the dotted lines, and the inductance values of the rotor 10 (shown in FIG. 1) are indicated by the solid lines. As shown in FIG. 4, the embedding of permanent magnets 15 in the annular connector 14 increases the magnetic resistance in the magnetic passages of the annular connector 14 on the q-axis. The d-axis inductance (Ld) is substantially unchanged, and the q-axis inductance (Lq) is effectively reduced. This increases the difference (|Ld−Lq|) between the d-axis inductance (Ld) and the q-axis inductance (Lq), and therefore increases the reluctance torque (Tq) of the reluctance motor 1.

Because the permanent magnets 15 only need enough magnetic force to magnetically saturate the annular connector 14, high-performance magnets with strong magnetic force such as neodymium magnets are not required, and dysprosium (Dy)-free magnets and inexpensive ferrite magnets can be used.

Also, because the permanent magnets 15 are embedded within the annular connector 14, the magnetic force of the permanent magnets 15 does not affect the stator 2 (shown in FIG. 1). As a result, an occurrence of drag loss does not affect the efficiency of the reluctance motor 1.

In the rotor 10 for reluctance motor 1 in this embodiment, as explained above, flux barriers 20, which include magnetic paths 13 formed between slits 12, are arranged in the circumferential direction at a predetermined interval, and adjacent flux barriers 20 are concatenated on the inner circumferential side by annular connector 14 provided on the inner circumferential side and separated on the outer circumferential side by openings 16 provided on the outer circumferential side. Also, permanent magnets 15 are embedded within the annular connector 14. The annular connector 14 in which adjacent flux barriers 20 are concatenated is magnetically saturated by the embedded permanent magnets 15, and the magnetic resistance of the annular connector 14 is increased. The increased magnetic resistance lowers the q-axis inductance (Lq), increases the reluctance torque, and improves the torque characteristics of reluctance motor 1. In other words, magnetic saturation of the annular connector 14 (i.e., a portion of the rotor yoke) is the main purpose for including permanent magnets 15 within the annular connector 14. Because this increases the magnetic resistance of the annular connector 14, a configuration can be realized having a greater saliency difference.

Because the permanent magnets 15 only have enough magnetic force to magnetically saturate the annular connector 14, they do not experience the demagnetizing field effect that commonly occurs in permanent magnets 15. Also, in order to use them in a high permeance environment, a high retention force material is not required. Thus, dysprosium (Dy)-free magnets and inexpensive ferrite magnets can be used.

Because the flux barriers 20 are integrally concatenated by annular connector 14, a conventional structural design can be used for the rotor 10, the mechanical strength of the rotor 10 is greater, and the rotor 10 is highly reliable in operating environments requiring high-speed rotation and both rapid acceleration and deceleration.

Because the permanent magnets 15 are magnetized in the radial direction of the rotor 10 and embedded within the annular connector 14, the magnetic force of the permanent magnets 15 acting on the stator 2 does not cause drag loss. As a result, measures such as field weakening are not required even at high rotational speeds.

Although described herein as magnetized in the radial direction of rotor 10, in an alternative embodiment permanent magnets 15 may be magnetized in the circumferential direction of the rotor 10. In this way, the annular connector 14 may also be magnetically saturated by the embedded permanent magnets 15, and the magnetic resistance of the annular connector 14 increased.

The systems and apparatus described herein are not limited to the embodiments described above. Suitable modifications and improvements are certainly possible. For example, if necessary, a highly magnetic-resistant material may be included within the slits 12 to further increase the magnetic resistance and reduce the q-axis inductance (Lq). Also, the number of slits 12 is not limited to three. Any number of slits is possible within the range of acceptable strength for the rotor 10.

Moreover, the systems and apparatus described herein facilitate operation of a reluctance motor. More specifically, the rotor described herein facilitates improving torque characteristics of a reluctance motor while maintaining rotor strength and manufacturing ease. A plurality of flux barriers 20 that include at least one magnetic path 13 formed between a plurality of slits 12 are arranged in the circumferential direction at a predetermined interval. Adjacent flux barriers 20 are concatenated on the inner circumferential side by a portion of rotor core 11 referred to herein as the annular connector 14 and separated on the outer circumferential side by openings 16 provided on the outer circumferential side. Moreover, in some embodiments, permanent magnets 15 are embedded within the annular connector 14.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A rotor for a reluctance motor, said rotor comprising:
    a plurality of flux barriers including at least one magnetic path formed between a plurality of slits, the flux barriers arranged in a circumferential direction at a predetermined interval, wherein adjacent flux barriers are concatenated on an inner circumferential side by an annular connector provided on the inner circumferential side and adjacent flux barriers are separated on an outer circumferential side by openings provided on the outer circumferential side; and
    a first permanent magnet at least partially embedded within the annular connector and magnetized in a radial direction of the rotor.

2. A rotor according to claim 1, further comprising a second permanent magnet adjacent to the first permanent magnet and separated from the first permanent magnet by the annular connector, wherein either a north pole of the first permanent magnet and a north pole of the second permanent magnet are positioned radially outward with respect to corresponding south poles, or a south pole of the first permanent magnet and a south pole of the second permanent magnet are positioned radially outward with respect to corresponding north poles.

3. A rotor according to claim 1, further comprising a second permanent magnet adjacent to the first permanent magnet and separated from the first permanent magnet by the annular connector, wherein a north pole of the first permanent magnet is positioned radially outward with respect to a south pole of the first permanent magnet and a south pole of the second permanent magnet is positioned radially outward with respect to a north pole of the second permanent magnet.

4. A rotor according to claim 1, wherein the openings provided on the outer circumferential side of the rotor extend axially from a first end of the rotor to a second end of the rotor.

5. A rotor according to claim 1, wherein the slits are substantially arc-shaped and include a protruding side that faces a central axis of the rotor.

6. A rotor in accordance with claim 5, wherein the slits are spaced in a radial direction from the central axis and constitute a barrier to magnetic flux.

7. A rotor in accordance with claim 1, wherein the permanent magnet is configured to reduce a q-axis inductance (Lq) by increasing magnetic resistance in magnetic paths on a q-axis.

8. A rotor in accordance with claim 1, further comprising a plurality of indentations defined within the outer circumferential side of the rotor, the indentations extend axially along an outer surface of the rotor and are centered at a centerline of the slits.

9. A reluctance motor comprising:
    a stator that includes a stator core having a plurality of stator teeth; and
    a rotor configured to rotate with respect to the stator about a central axis that extends through a center of the rotor from a first end of the rotor to a second end of the rotor, the rotor comprising:
        a rotor core that includes an inner surface and an outer surface coaxially arranged about the central axis;
        a plurality of flux barriers defined within the rotor core, the flux barriers extending axially through the rotor core from the first end to the second end;
        an annular connector included within the rotor core, wherein adjacent flux barriers are concatenated on an inner circumferential side by the annular connector;
        a plurality of openings defined within the rotor core along the outer surface of the rotor core, wherein adjacent flux barriers are separated by an opening of the plurality of openings; and
        a permanent magnet at least partially embedded within the annular connector and magnetized in a radial direction of the rotor.

10. A reluctance motor in accordance with claim 9, wherein each of the plurality of openings extends axially from the first end of the rotor to the second end of the rotor.

11. A reluctance motor in accordance with claim 9, wherein each flux barrier comprises a plurality of slits and a plurality of magnetic paths defined within the rotor core.

12. A reluctance motor in accordance with claim 11, wherein the slits are spaced in a radial direction from the central axis and constitute a barrier to magnetic flux.

13. A reluctance motor in accordance with claim 9, wherein the permanent magnet is configured to reduce a q-axis inductance (Lq) by increasing magnetic resistance of magnetic paths in a q-axis.

14. A reluctance motor in accordance with claim 9, wherein a radial distance from the central axis to the outer surface of the rotor core at a center of the slits is less than a maximum radial distance from the central axis to the outer surface.

15. A rotor comprising:
a rotor core having an inner circumferential side and an outer circumferential side, the rotor core including a plurality of flux barriers arranged in a circumferential direction around the rotor core at a predetermined interval, wherein flux barriers that are adjacent to each other in the circumferential direction are concatenated on the inner circumferential side by an annular connector that includes a permanent magnet at least partially embedded therein and magnetized in a radial direction of the rotor, and the adjacent flux barriers are separated by openings in the rotor core that extend to the outer circumferential side.

16. A rotor in accordance with claim 15, wherein the permanent magnet is configured to magnetically saturate the annular connector.

17. A rotor in accordance with claim 15, further comprising a plurality of indentations defined within the outer circumferential side of the rotor core, wherein each indentation extends axially along an outer surface of the rotor core and is centered on a centerline of a flux barrier of the plurality of flux barriers.

18. A rotor in accordance with claim 2, wherein the plurality of permanent magnets are positioned along a d-axis.

19. A rotor in accordance with claim 7, wherein the permanent magnet is further configured to increase a reluctance torque (Tq) by reducing the q-axis inductance (Lq) without substantially changing a d-axis inductance (Ld).

20. A reluctance motor in accordance with claim 9, wherein the permanent magnet further comprises a plurality of permanent magnets arranged along a d-axis.

21. A reluctance motor in accordance with claim 13, wherein the permanent magnet is further configured to increase a reluctance torque (Tq) by reducing the q-axis inductance (Lq) without substantially changing a d-axis inductance (Ld).

* * * * *